United States Patent
Kasai et al.

(10) Patent No.: US 8,400,267 B2
(45) Date of Patent: Mar. 19, 2013

(54) VEHICLE AUTHENTICATION DEVICE

(75) Inventors: Yoshiyuki Kasai, Kasugai (JP); Tomoko Onoda, Kasugai (JP)

(73) Assignee: OMRON Corporation, Kyoto (JP)

( * ) Notice: Subject to any disclaimer, the term of this patent is extended or adjusted under 35 U.S.C. 154(b) by 279 days.

(21) Appl. No.: 12/580,770

(22) Filed: Oct. 16, 2009

(65) Prior Publication Data

US 2010/0097175 A1    Apr. 22, 2010

(30) Foreign Application Priority Data

Oct. 16, 2008    (JP) ................................ 2008-267153

(51) Int. Cl.
    *G05B 19/00*    (2006.01)
(52) U.S. Cl. ....................................................... 340/5.8
(58) Field of Classification Search ............... 340/5.8, 340/5.6, 3.1, 12.22; 240/5.64; 307/10.1
See application file for complete search history.

(56) References Cited

U.S. PATENT DOCUMENTS

| | | | | |
|---|---|---|---|---|
| 5,736,935 | A | * | 4/1998 | Lambropoulos ......... 340/426.16 |
| 5,744,875 | A | * | 4/1998 | Kleefeldt et al. ............ 307/10.2 |
| 6,225,890 | B1 | * | 5/2001 | Murphy .................... 340/426.19 |
| 2005/0132994 | A1 | * | 6/2005 | Itou et al. .................... 123/179.3 |

FOREIGN PATENT DOCUMENTS

| | | |
|---|---|---|
| EP | 1669264 A1 | 6/2006 |
| JP | 2001-018754 A | 1/2001 |
| JP | 2005104197 A | 4/2005 |
| JP | 2006169753 A | 6/2006 |
| JP | 2008168762 A | 7/2008 |

OTHER PUBLICATIONS

Office Action Issued in Japanese Application No. 2008-267153, Dated Aug. 27, 2012 (4 Pages With English Translation).
Patent Abstracts of Japan, Publication No. 2006-169753, Dated Jun. 29, 2006 (1 Page).
Patent Abstracts of Japan, Publication No. 2008-168762, Dated Jul. 24, 2012 (1 Page).

* cited by examiner

*Primary Examiner* — Vernal Brown
(74) *Attorney, Agent, or Firm* — Osha Liang LLP

(57) ABSTRACT

A vehicle authentication device has an in-vehicle device mounted on a vehicle, an authentication unit disposed in the in-vehicle device, for matching an ID returned from a portable device in response to a request from the in-vehicle device and performing an authentication of the vehicle, and an operation switch for instructing a power supply transition of the vehicle. The in-vehicle device has a measurement unit for measuring a duration of an active state of the operation switch, a determination unit for determining whether the duration exceeds a predetermined time, and a control unit for executing a power supply transition control of the vehicle based on the determination that the duration time of the active state of the operation switch exceeds the predetermined time made by the determination unit and an authentication result of the authentication unit.

3 Claims, 3 Drawing Sheets

VEHICLE AUTHENTICATION DEVICE

BACKGROUND OF THE INVENTION

1. Technical Field

The present invention relates to vehicle authentication devices, and more specifically, to a vehicle authentication device for matching identification information (hereinafter, referred to as an ID) specific to a vehicle registered in a portable device or a portable device with an in-vehicle device mounted on the vehicle to permit engine startup and the like of the vehicle.

2. Related Art

A vehicle authentication device capable of permitting engine startup and the like without using a mechanical key is used. For instance, the summary of a vehicle authentication device (hereinafter, referred to as a conventional art) described in Japanese Unexamined Patent Publication No. 2001-18754 states that "when an ignition knob is turned from a steering wheel lock position to another position, a request signal is transmitted to a portable device and a first ID is received from the portable device, the received first ID is matched with an ID registered in advance, and a steering wheel lock is unlocked and a second ID for permitting actuation of the engine is output if the first ID coincides the registered ID. The output second ID is matched with an ID stored in advance, and actuation of the engine is permitted if the matching result of matching is obtained by the engine control unit".

SUMMARY

However, the configuration of the conventional art performs an ID authentication with "when the ignition knob is turned from a steering wheel lock position to another position" as a trigger, and permits unlocking of a steering wheel lock and startup of the engine according to an authentication result.

The push-type ignition switch is a switch of easy and convenient operation that does not require a "turning operation" as with a knob-type ignition switch, and merely needs to be pushed with a fingertip, and is used in many vehicles nowadays for its excelling operability.

On the contrary to the excelling operability, an involuntary ignition operation might be performed when touched with the fingertip by mistake in such a push-type ignition switch. Such an involuntary operation sometimes occurs in the knob-type ignition switch as well, but the possibility is significantly low or almost never compared to the push-type ignition switch. This is because an extra operation of turning is necessary.

Consider a case of applying the conventional art to the vehicle having the push-type ignition switch. In this case, no troubles arise when the intended ignition operation is performed. This is because with such an ignition operation as a trigger, the order of match first ID→unlock steering wheel lock→match second ID→permit engine startup is followed to consequently perform the engine startup as intended.

However, troubles may arise if an involuntary ignition operation (pushed by mistake) is performed. For instance, when a person (often driver possessing a portable device) who performed the involuntary ignition operation moves away after the operation. In such a case, the process of match first ID→unlock steering wheel lock→match second ID→permit engine startup is performed without delay with the ignition operation as the trigger, even if it is involuntary, and thus the vehicle may be stolen, by any possibility, by a third person having bad intentions while the driver is away from the vehicle.

Therefore, in some conventional art, the vehicle with the push-type ignition switch in particular there is the possibility of vehicle ride-away when the involuntary switch operation is performed cannot be denied and in that it is vulnerable with respect to the theft of the vehicle.

One or more embodiments of the present invention provides a vehicle authentication device that avoids vulnerability with respect to the theft of the vehicle by not permitting the engine startup and the like when an unintended ignition switch operation is performed.

In accordance with one aspect of the present invention, a first aspect of the invention provides a vehicle authentication device having an authentication unit for matching an ID returned from a portable device in response to a request from an in-vehicle device mounted on a vehicle in the in-vehicle device and performing an authentication of the vehicle, and an operation switch for instructing a power supply transition of the vehicle; wherein the in-vehicle device includes a measurement unit for measuring duration of an active state of the operation switch, a determination unit for determining whether or not the duration exceeded a predetermined time, and a control unit for executing a power supply transition control of the vehicle based on the determination that the duration time of the active state of the operation switch exceeded the predetermined time made by the determination unit and an authentication result of the authentication unit.

A second aspect of the present invention provides the vehicle authentication device according to the first aspect, wherein the predetermined time is set as a time a driver intentionally operates a switch for generating a power supply transition control signal.

A third aspect of the present invention provides the vehicle authentication device according to the first aspect, wherein the control unit further permits engine startup of the vehicle when a foot brake of the vehicle is depressed.

According to one or more embodiments of the present invention, there is provided a vehicle authentication device that avoids vulnerability with respect to the theft of the vehicle by not permitting the engine startup and the like when an unintended ignition switch operation is performed.

DETAILED DESCRIPTION

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Hereinafter, preferred embodiments of the present invention will be described with reference to the drawings.

Figure 1:
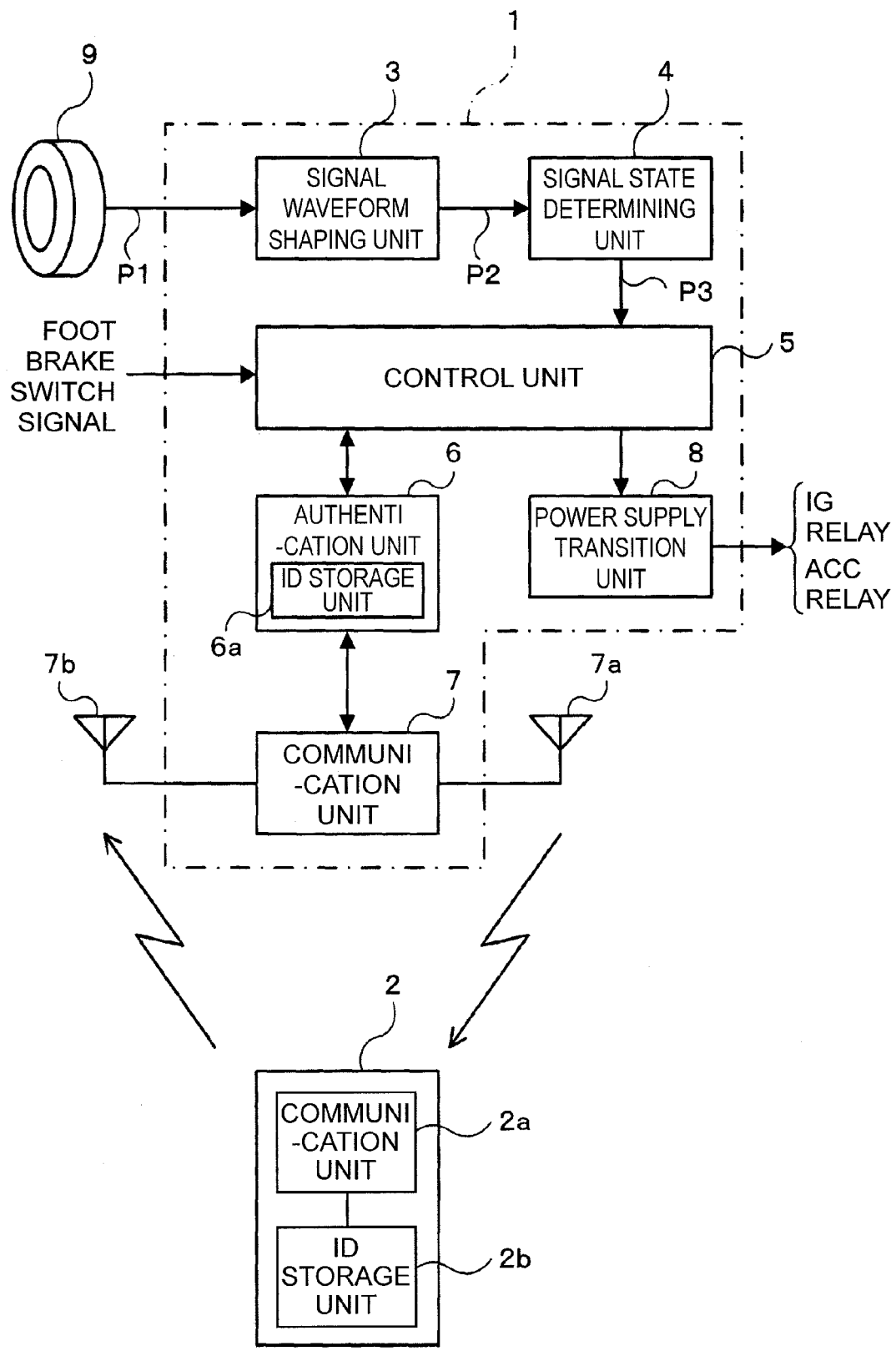
FIG. 1 is a system conceptual view according to an embodiment.

FIG. 1 is a system conceptual view according to an embodiment. In the figure, an in-vehicle device 1 is generally called an ECU (Electronic Control Unit) or a BCM (Body Control Module), and is installed in an engine room, a vehicle compartment and the like. A portable device 2 is carried around by a legitimate driver (possessor etc.) of the vehicle, which portable device 2 is sometimes called a remote controller.

The in-vehicle device 1 includes a signal waveform shaping unit 3, a signal state determining unit 4, a control unit 5, an authentication unit 6, a communication unit 7, and a power supply transition unit 8. The units may be configured by one unit or may be configured separately by a number of units.

The signal waveform shaping unit 3 retrieves a switch signal P1 from a push switch 9 appropriately operated by a driver, removes disturbance of the waveform such as chattering and generates and outputs the shaped binarization signal (hereinafter, referred to as a binarization switch signal P2). The push switch 9 is a momentary push button switch, and is a type in which the contact is conducted or non-conducted when the push button is pushed. The signal waveform shaping unit 3 may be configured using elements such as a resistor, a capacitor, and the like, but may be realized using other elements.

The signal state determining unit 4 determines a logic state of the binarization switch signal P2, and outputs a determination signal P3. The binarization switch signal P2 is a signal in which the voltage level has a state of either high level (logical value 1) or a low level (logical value 0), where one of either logical values is a logical value representing that the push switch 9 has been operated (push button is pushed). For the sake of convenience of the explanation, the logical value of 0 represents that the "push switch 9 is operated". In other words, the logical value of the binarization switch signal P2 is zero only while the push button of the push switch 9 is pushed.

The signal state determining unit 4 sets the determination signal P3 to "active" and outputs the same when the logical value of the binarization switch signal P2 is 0, and sets the determination signal P3 to "inactive" and outputs the same in other cases. The determination signal P3 is also a binarization signal of logical value 1 or logical value 0, where the determination signal P3 is "active" when logical value is 1 and "inactive" when the logical value is 0, for the sake of convenience of the explanation.

The signal state determining unit 4 can be realized by a program control type control element (computer). Specifically, the binarization switch signal P2 is read from an input port of the computer, whether the voltage level thereof is high level or low level is determined, and the determination signal P3 having the logical value corresponding to the determination result is retrieved from an output port.

The control unit 5 is a program control type control element (computer), for example, that makes an instruction to start the authentication process to the authentication unit 6 according to the control program incorporated in a non-volatile storage element (generally ROM or PROM) in the computer, and makes an instruction of power supply transition control to the power supply transition unit 8 when determined that the portable device 2 is legitimate as a result of the authentication by the authentication unit 6. If the vehicle authentication control device includes a steering wheel lock unit, the instruction of unlock control is also made to the steering wheel lock unit in authentication. The "power supply transition control" mentioned above includes a cyclic power supply transition control of OFF→ACC→IG→OFF→ACC performed every time the push switch 9 is pushed, and an engine startup performed at a specific stage (IG) during the cyclic power supply transition control, where the distinction thereof may be made based on a foot brake switch signal and the like.

The authentication unit 6 receives the ID returned from the portable device 2, which is carried by the passenger, through the communication unit 7 and performs matching of such an ID to carry out the authentication. The communication unit 7 includes a transmitter (not shown) and a transmission antenna 7a thereof for transmission at a very weak radio of LF band, and a receiver (not shown) and a reception antenna 7b thereof for reception at a very weak radio of UHF band, and performs request of information (ID) necessary for the authentication and reception of the information thereof with a communication unit 2a of the portable device 2.

The power supply transition unit 8 generates an operation signal of an IG relay and an ACC relay in response to the control instruction from the control unit 5, and outputs the same to such relays.

The authentication unit 6 of the in-vehicle device 1 and the portable device 2 respectively store matching information (ID) for authentication. ID storage units 2b, 6a in the figure are storage elements therefor. Each ID stored in the ID storage units 2b, 6a may be the same, or may be different information associated in some way.

In such a configuration, when the push switch 9 is operated, the binarization switch signal P2 output from the signal waveform shaping unit 3 has a logical value of 0, so that the signal state of the determination signal P3 output from the signal state determining unit 4 changes from "inactive" to "active".

As hereinafter described in detail, the control unit 5 instructs the start of authentication to the authentication unit 6 in response to the change to active of the determination signal P3, and the authentication unit 6 performs the authentication with the portable device 2 carried by the passenger through the communication unit 7 according to the instruction and notifies the authentication result to the control unit 5. The control unit 5 makes an instruction to permit power supply transition control to the power supply transition unit 8 under the condition (hereinafter, referred to as a specific condition) that the authentication result notified from the authentication unit 6 indicates "portable device 2 is legitimate" and "determination signal P3 continues to be active after elapse of a predetermined time (hereinafter, referred to as T)".

The control program of the present embodiment will be described below.

Figure 2:
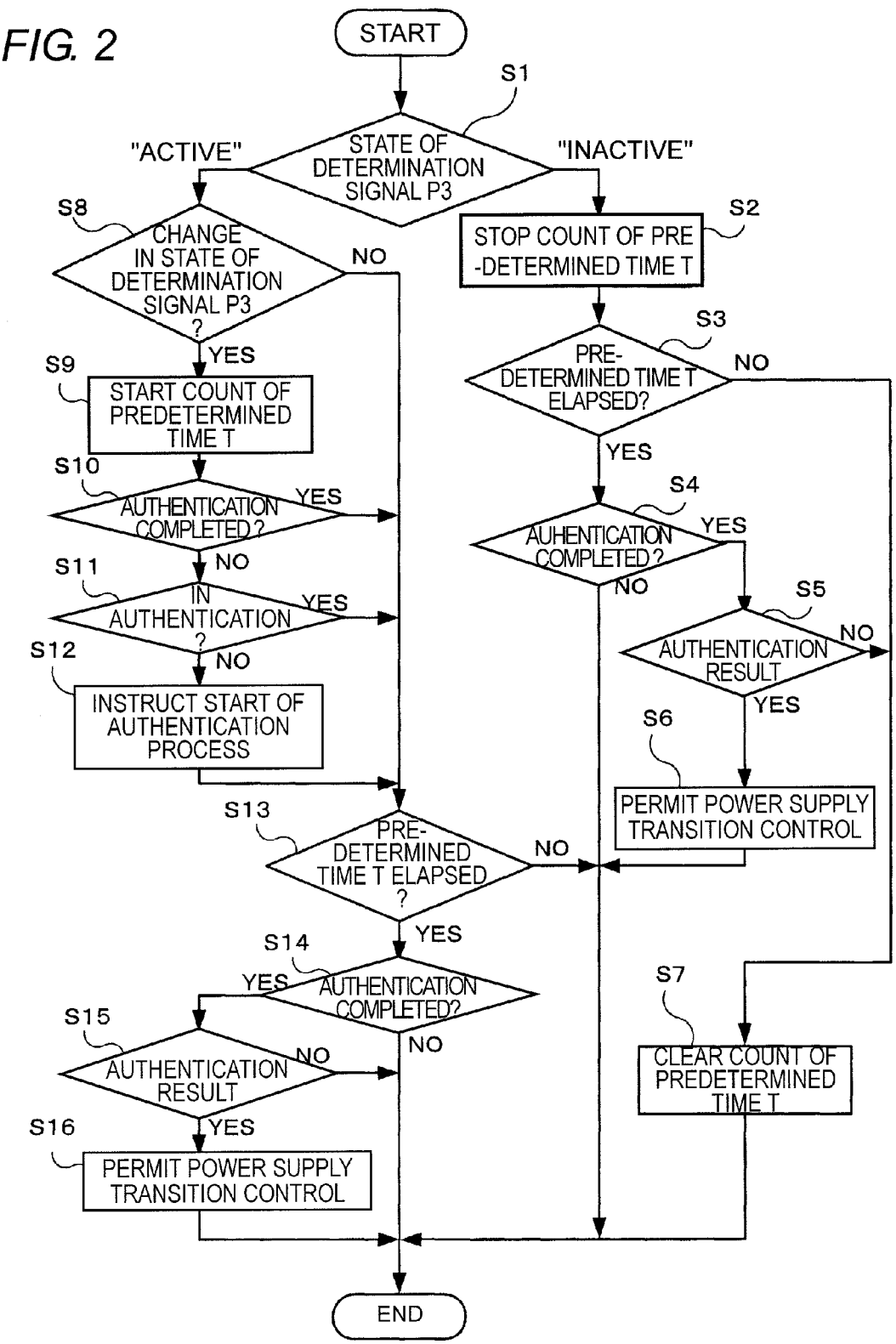
FIG. 2 is a view showing a flow of a control program of the present embodiment.

FIG. 2 is a view showing a flow of the control program of the present embodiment. The control program is periodically executed in the control unit 5 of the in-vehicle device 1. When the program starts, the state (active/inactive) of the determination signal P3 is first determined (step S1).

If the determination signal P3 is inactive, the count of the predetermined time T is stopped (step S2) and whether or not the predetermined time T has elapsed is determined (step S3), where the count of the predetermined time T is cleared (step S7) and the flow is terminated if the predetermined time T has not elapsed. If determined that the predetermined time T has elapsed in step S3, whether or not the authentication is completed is determined (step S4), where the flow is terminated if the authentication is not completed, and if the authentication is completed, whether to terminate the flow after the power supply transition control permission (step S6) or to terminate the flow without performing such permission (i.e., prohibiting power supply transition control) is determined (step S5) based on the authentication result.

Here, "authentication result?" in step S5 is an expression simplified for reasons of illustration. Such an expression specifically means determining whether or not the result of the authentication in the authentication unit 6 indicates "portable device 2 is legitimate". Since the determination of step S5 is performed when the determination result of "predetermined time T elapsed?" in step S3 is YES, the elapse of the predetermined time T is also simultaneously determined when determined that "portable device 2 is legitimate" in step S5. Therefore, step S3 and step S5 determine whether or not the "specific condition", that is, the authentication result notified from the authentication unit 6 indicates "portable device 2 is legitimate" and "determination signal P3 continues to be active after elapse of a predetermined time T".

If the determination signal P3 is active, whether or not there is change in the state of the determination signal P3 is determined (step S8). If the state of the determination signal P3 is "inactive" in the execution of the flow of the previous time, determination is made that there is change in the state of the determination signal P3, and if not (state of the determination signal P3 is "active" in the execution of the flow of the previous time), determination is made that there is no change. If there is change in the state of the determination signal P3, that is, if the state is changed from inactive to active, the count of the predetermined time T is started (step S9) and the completion of the authentication is determined (step S10). The elapse of the predetermined time T is determined (step S13) if the authentication is completed, and whether or not in authentication is determined (step S11) if the authentication is not completed, where the elapse of the predetermined time T is determined (step S13) if in authentication, and the elapse of the predetermined time T is determined (step S13) after making the instruction to start the authentication process (step S12) to the authentication unit 6 if not in authentication.

After the elapse of the predetermined time T is determined in step S13, whether or not the authentication is completed is determined (step S14), where the flow is terminated if the authentication is not completed, and if the authentication is completed, whether to terminate the flow after the power supply transition control permission (step S16) or to terminate the flow without performing such permission (i.e., prohibiting power supply transition control) is determined (step S15) based on the authentication result.

Here, "authentication result?" in step S15 also means determining whether or not the result of the authentication in the authentication unit 6 indicates "portable device 2 is legitimate", similar to "authentication result?" in step S5. Since the determination of step S15 is performed when the determination result of "predetermined time T elapsed?" in step S13 is YES, the elapse of the predetermined time T is consequently determined at the same time when determined that "portable device 2 is legitimate" in step S15. Therefore, step S13 and step S15 determine whether or not the "specific condition", that is the authentication result notified from the authentication unit 6 indicates "portable device 2 is legitimate" and "determination signal P3 continues to be active after elapse of a predetermined time T".

The specific operation of the present embodiment will now be described.

Figure 3A:
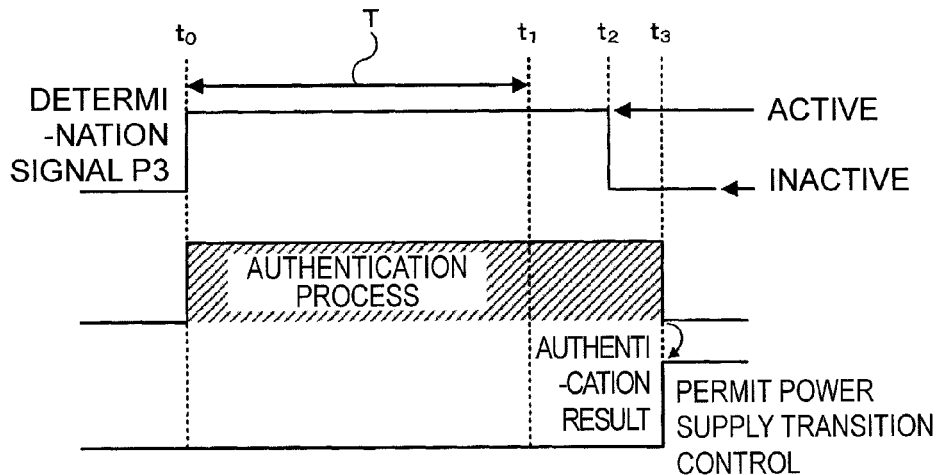
FIGS. 3A-C show a time sequence of the state of a determination signal P3 and an authentication and engine startup permission.
Figure 3B:
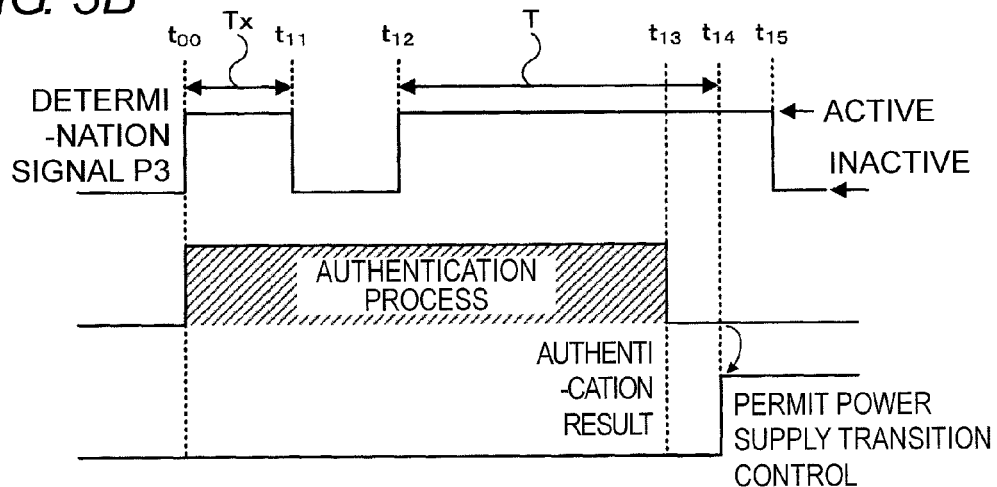
Figure 3C:
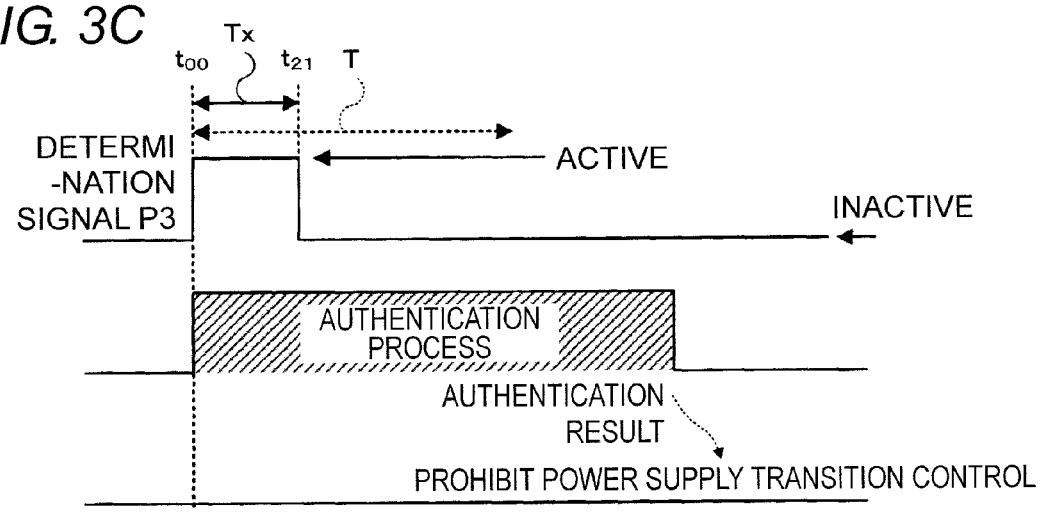

FIGS. 3A-C show a time sequence of the state of the determination signal P3 and the power supply transition control permission (or prohibition). The "power supply transition control" referred to in the figure includes the cyclic power supply transition control of OFF→ACC→IG→OFF→ACC performed every time the push switch 9 is pushed, and the engine startup performed at a specific stage (IG) during the cyclic power supply transition control, where the distinction thereof is made based on a foot brake switch signal (see FIG. 1) and the like. Specifically, the power supply transition control from the IG to the engine startup is carried out if the foot brake switch signal indicates "depressed state of foot brake", and the cyclic power supply transition control is repeated every time the push switch 9 is pushed if the foot brake switch signal does not indicate the same. This is because the operation of the push switch 9 performed in the "depressed state of foot brake" can be assumed as an operation performed in the intention of starting up the engine. Furthermore, maintaining the "depressed state of foot brake" is important in engine startup in terms of ensuring safety, that is, preventing sudden acceleration caused by mistaken depression of the acceleration and the brake.

First, a simple example (a) in a case where the intended push button operation (operation of push switch 9) is performed will be described. In (a), assume that the determination signal P3 changes from inactive to active at time t0, and the determination signal P3 changes (returns) from active to inactive at time t2 beyond the predetermined time T. The predetermined time T is set as a time the driver has intentionally operated the push switch 9. In other words, if the push button is pushed by mistake, the time the determination signal P3 is active is assumed to be smaller than the predetermined time T.

If the authentication result indicates the "specific condition", that is, "portable device 2 is legitimate" and "determination signal P3 continues to be active after elapse of a predetermined time T", the power supply transition control is permitted to the power supply transition unit 8 from time t3 when the authentication result is obtained in this example.

In (a) to (c) of FIG. 3, the determination signal P3 before time t0 (t00) is inactive, and thus determination is made as "inactive" in step S1 before time t0 (t00). Therefore, the process proceeds from "stop count of predetermined time T" of step S2 to step S3 and "predetermined time T elapsed?" is determined in step S3, but since the count of the predetermined time T is not yet carried out at this stage, the determination result of step S3 is NO, and the flow is terminated through "clear count of predetermined time T" of step S7.

Therefore, the loop of step S1→step S2→step S3→step S7→end is merely repeated before time t0 (t00).

In (a) to (c) of FIG. 3, when the state of the determination signal P3 changes from inactive to active at the time point of time t0 (t00), the determination result of step S1 becomes "active". In this case, since the state of the determination signal P3 immediately before time t0 (t00) is "inactive", the state changes from inactive to active, the determination result of step S8 becomes YES, "start count of predetermined time T" of step S9 is executed, and "authentication completed?" is determined in step S10.

Since the authentication has not yet started at this stage, the determination result of step S10 becomes NO, the determination result of "in authentication?" of step S11 also becomes NO, and the process proceeds to step S12 to execute "instruct start of authentication process". The authentication process (hatched portion) in (a) to (c) of FIG. 3 then starts. Thereafter, "predetermined time T elapsed?" is determined in step S13, but since the count of the predetermined time T has just started (step S9) at this stage, the determination result of step S13 becomes NO, and the flow is terminated.

Therefore, the start of the count of the predetermined time T and the instruction for the start of the authentication process are performed at the time point of time t0 (t00).

The determination result of step S1 is "active" from time t0 until immediately before elapse (t1) of the predetermined time T in (a) of FIG. 3. Thus, the determination result of step S8 becomes NO and "predetermined time T elapsed?" is determined in step S13, where the flow is terminated since the predetermined time T has not yet elapsed at this stage.

Therefore, the loop of step S1→step S8→step S13→end is merely repeated while counting the predetermined time T from time t0 until immediately before elapse (t1) of the predetermined time T.

In (a) of FIG. 3, at the time point of time t1, that is, at the time point the predetermined time T has elapsed, the determination result of step S13 becomes YES, and the process proceed to step S14 to determine "authentication completed?", where the flow is terminated since the authentication is still being performed at this time point (time t1).

Therefore, the loop of step S1→step S8→step S13→end is merely repeated while counting the predetermined time T from time t0 until elapse (t1) of the predetermined time T.

Next, in (a) of FIG. 3, the determination result of step S14 remains NO at the time point of time t2, that is, at the time point after the predetermined time T has elapsed and during the authentication process, and thus the flow is similarly terminated.

Therefore, the loop of step S1—step S8—step S13—step 14—end is merely repeated while counting the predetermined time T from time t0 until elapse (t2) of the predetermined time T.

In (a) of FIG. 3, the determination result of step S14 becomes YES at the time point of time t3, that is, at the time point after the predetermined time T has elapsed and the authentication process is completed. At time t3, whether or not the authentication result notified from the authentication unit 6 indicates "portable device 2 is legitimate" is determined in step S15, if the determination result is YES, where the power supply transition control permission is executed in step S16 and then the flow is terminated, and if the determination result is NO, the flow is terminated as is.

Therefore, the permission for prohibition of the power supply transition control based on the authentication result is performed at the time point (time 3) after the predetermined time T has elapsed and the authentication process is completed.

Now, a slightly complicating example (b) in a case where the intended push button operation (operation of push switch 9) is performed will be described. In (b), assume that the determination signal P3 changes from inactive to active at time t00, the determination signal P3 changes (returns) from active to inactive at time t11 after a time Tx shorter than the predetermined time T has elapsed, the determination signal P3 again changes from inactive to active at time t12 after time t11, and the determination signal P3 changes (returns) from active to inactive at time t14 after the predetermined time T has elapsed from time t12. If the authentication result indicates the "specific condition", that is, "portable device 2 is legitimate" and "determination signal P3 continues to be active after elapse of a predetermined time T", the power supply transition control is permitted to the power supply transition unit 8 at time t14 when the predetermined time T has elapsed.

The time sequence (b) is an example involving a so-called chattering operation in which the determination signal P3 temporarily changes from inactive to active. The chattering phenomenon occurs when the button is pushed twice, when the contact failure involved in the degradation of the push switch 9 has occurred, or the like. The time Tx indicating the chattering period is a time significantly shorter than the predetermined time T. In other words, it is important that the predetermined time T is set to an appropriate time that reliably exceeds the representative chattering period.

When the determination signal P3 changes from active to inactive at time t11 of (b), the determination result of step S1 becomes "inactive" at the relevant time point, and the count of the predetermined time T is stopped in step S2. Since Tx<T, as described above, the predetermined time T is not yet exceeded at this time point. Thus, the determination result of step S3 is NO, the count of the predetermined time T is cleared in step S7, and then the flow is terminated.

Therefore, the stopping of the count of the predetermined time T and the clearing of the count are performed while continuing the authentication process at the time point of time t11 of (b).

In (b), at the time point (time 12) the determination signal P3 again changes to active, the determination result of step S1 becomes "active" and the determination result of step S8 becomes YES. The count of the predetermined time T is then started in step S9 and "authentication completed?" is determined in step S10, but since the authentication is still being carried out at the relevant time point (time t12), the process proceeds to step S13 to determine "predetermined time T elapsed?", where the flow is terminated since the predetermined time T has not elapsed.

Therefore, at the time point of time t12 of (b), the count of the predetermined time T is again started while continuing the authentication process.

Next, in (b), the determination result of step S1 becomes "active" and the determination result of step S8 becomes NO at the time point (t13) the authentication process is completed, where the determination result of step S13 becomes NO and the flow is terminated since the predetermined time T has not elapsed at time t13.

Therefore, at the time point of time t13 of (b), the count of the predetermined time T is continued while continuing the authentication process.

Next, in (b), the determination result of step S1 becomes "active" and the determination result of step S8 becomes NO at the time point (t14) the predetermined time T has elapsed, where the determination results of step S13 and step S14 both become YES.

Therefore, at the time t14 of (b), the process proceeds to step S15, and the determination on the permission for prohibition of the power supply transition control based on the authentication result is performed. In other words, if the authentication result notified from the authentication unit 6 indicates "portable device 2 is legitimate", the power supply transition control is permitted, and if not, the flow is terminated (power supply transition control is substantially prohibited).

The two time sequences (a), (b) above are both based on the intended operation (legitimate operation) of the push switch 9 performed by the driver and the like holding the portable device 2. The difference between (a) and (b) is merely the presence of the chattering phenomenon. The technical ideal to be recognized from the time sequences (a), (b) is to "permit power supply transition control based on the authentication result only when the operation time (active period of determination signal P3) of the push switch 9 exceeds the predetermined time T".

In other words, even if determined to permit the power supply transition control as a result of the authentication process, determination is made that the operation is unintentional, such as the operation is carried out as a result of the fingertip touching the push switch 9 by mistake, if the operation time (active period of determination signal P3) of the push switch 9 does not exceed the predetermined time T, so that the power supply transition control is not permitted to prevent theft such as ride-away of the vehicle by a third person having bad intentions.

The time sequence (c) of FIG. 3 shows a case where the unintentional operation of the push switch 9 is performed. The difference with (a) and (b) lies in that the active period of the determination signal P3 does not exceed the predetermined period T.

In (c), assume that the determination signal P3 changes from inactive to active at time t00, and the determination signal P3 changes (returns) from active to inactive at time t21 when a time Tx shorter than the predetermined time T has elapsed. Since the predetermined time T is set as a time the driver has intentionally operated the push switch 9, as mentioned above, the signal change does not meet the predetermined time T if the determination signal P3 changes (returns) from active to inactive at time t21 when the time Tx shorter than the predetermined time T has elapsed, whereby determination can be made that the operation is obviously a mistaken push button operation. In such a case, therefore, the power supply transition control is not permitted (prohibit power supply transition control) to the power supply transition unit 8 even if "portable device 2 is legitimate" is indicated.

Therefore, when the unintended push button operation (operation of push switch 9) is performed, the vehicle will not be taken over by a third person having bad intentions even if the operator moves away from the vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle authentication device comprising:
   an in-vehicle device mounted on a vehicle;
   an authentication unit disposed in the in-vehicle device, for matching an ID returned from a portable device in response to a request from the in-vehicle device and performing an authentication of the vehicle, and
   an operation switch for instructing a power supply transition of the vehicle;
   wherein the operation switch is an operation push button switch,
   wherein the in-vehicle device comprises:
      a measurement unit for measuring a duration of an active state of the operation switch,
      a determination unit for determining whether the duration exceeds a predetermined time, and
      a control unit for executing a power supply transition control of the vehicle based on a simultaneous occurrence of the determination that the duration time of the active state of the operation switch exceeds the predetermined time made by the determination unit and an authentication result of the authentication unit that the portable device is legitimate, and
   wherein the active state is a state in which the operation switch is pushed.

2. The vehicle authentication device according to claim 1, wherein the predetermined time is set as a time a driver intentionally operates a switch for generating a power supply transition control signal.

3. The vehicle authentication device according to claim 1, wherein the control unit further permits engine startup of the vehicle when a foot brake of the vehicle is depressed.

* * * * *